(12) United States Patent
Kuster (10) Patent No.: US 9,036,021 B2
(45) Date of Patent: May 19, 2015

(54) AUTOFOCUSING METHOD AND DEVICE FOR A MICROSCOPE

(75) Inventor: Manfred Kuster, Widnau (CH)

(73) Assignee: LEICA MICROSYSTREMS (SCHWEIZ) AG, Heerbrugg (CH)

( * ) Notice: Subject to any disclaimer, the term of this patent is extended or adjusted under 35 U.S.C. 154(b) by 498 days.

(21) Appl. No.: 13/610,994

(22) Filed: Sep. 12, 2012

(65) Prior Publication Data

US 2013/0070076 A1 Mar. 21, 2013

(30) Foreign Application Priority Data

Sep. 15, 2011 (DE) .......................... 10 2011 082 756

(51) Int. Cl.
G02B 21/02 (2006.01)
G02B 7/28 (2006.01)
G02B 21/00 (2006.01)
H04N 7/18 (2006.01)

(52) U.S. Cl.
CPC ................ G02B 21/025 (2013.01); H04N 7/18 (2013.01); G02B 7/282 (2013.01); G02B 21/0012 (2013.01)

(58) Field of Classification Search
None
See application file for complete search history.

(56) References Cited

U.S. PATENT DOCUMENTS

| 5,288,987 | A | 2/1994 | Vry et al. |
| 5,925,874 | A | 7/1999 | Liegel et al. |
| 6,884,980 | B2 | 4/2005 | Spink |
| 7,626,151 | B2 | 12/2009 | Sander |
| 7,991,209 | B2 | 8/2011 | TÜmpner |
| 2002/0186464 | A1 | 12/2002 | Schmalz |
| 2008/0151097 | A1 | 6/2008 | Chen et al. |
| 2009/0244698 | A1 | 10/2009 | Zust |
| 2011/0317260 | A1* | 12/2011 | Krueger ........................ 359/383 |

FOREIGN PATENT DOCUMENTS

DE 3328821 C2 2/1985

OTHER PUBLICATIONS

Leica Microsystems (Schweiz) AG, Brochure: "Leica M720 OH5 Premium Surgical Microscope A New Dimension of Innovation and Comfort," Jul. 2011, Heerbrugg, Switzerland.
Leica Microsystems (Schweiz) AG, Press Release: "New from Leica Microsystems—the World's Most Compact Neurosurgical Microscope with Horizontal Optics," Feb. 11, 2008, Heerbrugg, Switzerland.

* cited by examiner

*Primary Examiner* — Dave Czekaj
*Assistant Examiner* — Nam Pham
(74) *Attorney, Agent, or Firm* — Hodgson Russ, LLP (57) ABSTRACT

A method and device for autofocusing in a microscope (11), wherein two preferably spot-shaped, markers (12) are generated on an object, the spacing (d) of the markers representing an indication of the defocusing of a working plane (9) in the object from the focal plane (10) of the microscope (11). A focus drive (6) displaces the working plane (9) into the focal plane (10) as a function of the marker spacing (d). In order to allow rapid and exact focusing to be performed, a detector (4) acquires an image of the markers (12) generated on the object, an evaluation unit (7*a*) determines the spacing of the markers (12), and a control unit (7*b*) adjusts, as a function of the determined marker spacing (d), the speed of the focus drive (6) at which the working plane (9) is displaced into the focal plane (10).

22 Claims, 3 Drawing Sheets

AUTOFOCUSING METHOD AND DEVICE FOR A MICROSCOPE

CROSS REFERENCE TO RELATED APPLICATIONS

This application claims priority of German patent application number 10 2011 082 756.0 filed Sep. 15, 2011, the entire disclosure of which is incorporated by reference herein.

FIELD OF THE INVENTION

The present invention relates to an autofocusing method and an autofocusing device for a microscope, in particular a surgical microscope, of the type wherein at least two markers are generated on an object and the spacing between the markers indicates the defocusing of a working plane in the object from the focal plane of the microscope.

BACKGROUND OF THE INVENTION

Known autofocus devices comprise an autofocusing optic for generating an autofocus beam path that generates an autofocus pattern on the object, the autofocus beam path usually being guided onto the object by means of a deflection element. An autofocus device of this kind furthermore comprises an autofocus evaluation unit to which a detector beam path is delivered by means of a deflection element, said detector beam path representing the radiation, reflected from the object, of the autofocus beam path.

DE 41 31 737 C2 describes an autofocus device for a stereomicroscope having a main objective. With this autofocus device, a projection beam path is generated by a projection optic and in turn, after passage through the main objective, generates a line pattern on the object surface. Light of the projection beam path reflected from the object is coupled out and is delivered to a light-sensitive, spatially resolving position detector. A defocusing operation results in a lateral shift of the image of the line pattern (linear marking) on the position detector, this lateral shift being recorded via the autofocus evaluation unit and being used as a closed-loop control signal for refocusing for a focus drive. For autofocusing, the latter adjusts the intercept distance of the objective being used, or displaces the entire stereomicroscope along the optical axis.

DE 10 2006 040 636 B3 proposes, based on the arrangement described in accordance with DE 41 31 737 C2, an autofocus device in which a micromirror array having individually controllable and adjustable micromirrors is provided in shared fashion as a deflection element for the autofocus beam path and the projection beam path, and as a deflection element for the detector beam path. By means of the micromirror array, the autofocus pattern can be modified in controlled fashion both in terms of its location and geometry, and in terms of its light intensity, by corresponding application of control to the micromirrors. In addition, the illumination optic that is in any case present in a microscope for illuminating the object can be used to generate the autofocus beam path. The micromirror array can thus take on two functions: on the one hand it generates, from the illumination beam path, the autofocus beam path for generating an autofocus pattern on the object; and on the other hand it couples out the detector beam path, which in turn is guided onto the autofocus evaluation unit. This document describes the generation of two spot beams by suitable adjustment of micromirrors in the micromirror array. The spot beams proceeding from the micromirror array pass through the main objective of the microscope and are focused by it. If the intersection point of the two spot beams is located above or below the object, two spots are then visible on the object. For autofocusing, a main objective of fixed focal length is shifted until only one spot (merger of the two spots visible when defocused) is visible on the object. With a vario objective (objective of variable focal length), the focal length is adjusted accordingly. Regarding details of this and other types of autofocusing using the autofocus device described, reference is made explicitly to the aforesaid patent document DE 10 2006 040 636 B3. By this reference, the corresponding disclosure is expressly intended to become a constituent of this Application.

Another autofocus device is known from EP 1 241 506 B1. Here a (video) camera, which is present on a surgical microscope for documentation purposes, is used to locate the correct focus position of the microscope. The camera comprises an image acquisition device and a signal processor unit, the latter ascertaining the optimal focus using, for example, the contrast method. By means of an interface in the camera and a further interface in the microscope, the closed-loop control signals generated by the camera are transferred, for focusing, into a control unit of the microscope, which unit applies control to corresponding positioning units in the microscope which modify the objective focal length for autofocusing. Except for the aforesaid (video) camera, a separate measurement module is not used with this system.

Autofocusing is performed in similar fashion in EP 1 255 146 B1; here a two-dimensional histogram is produced by evaluating the change in the image content of a microscope image sensor, and from that histogram a specific motion activity is derived. An autofocus unit can thereby, based on the data ascertained, place the focus into a region of maximum activity, i.e. for example into a region investigated with a surgical instrument.

DE 33 28 821 C2 discloses an autofocus device for microscopes having at least two alternatingly switched light sources, such as infrared diodes, which are arranged next to one another in the vicinity of a pupil of the microscope. The beams proceeding from the light sources are reflected into the beam path of the microscope. The light sources illuminate a mark that represents, in particular, a grid constituted from transparent and reflective stripes. This mark is imaged in autocollimation onto itself If the object is located at the focus of the microscope, the beams proceeding toward the object through the transparent stripes of the mark once again proceed, on the return path, through the same regions of the mark. If the object is not in focus, however, a beam proceeding through a transparent stripe of the mark then experiences a lateral offset upon reflection at the object, and arrives onto a reflective strip arranged above or below the transparent stripe (depending on the sign of the defocusing). If the reflective stripes are arranged at a specific angle to one another adjacently to the transparent stripes, the sign of the defocusing can then also be ascertained.

Lastly, an autofocus device referred to as "SpeedSpot," which works with two laser beams that generate two spot-shaped markers on the object which in turn merge into one spot when the focus position of the object plane is optimal, is known from the Leica model M720 OH5 surgical microscope. The customer selects a fixed focusing speed for autofocusing. Focusing occurs in such a way that the laser spots that are spaced apart are merged into one spot by bringing the object plane closer to the focal plane. If there is a large deviation between the optimum focal plane and the object plane, the procedure of bringing the object plane closer to the optimum focal plane is usually perceived by the user to be too time-consuming. At high magnifications, conversely, the fixed focusing speed can cause the region of the focal plane to be passed through too quickly. Because of the shallow depth of field at high magnifications, detection of the merger of the laser dots, in particular by a user, is often possible only with difficulty.

The object that arises in the context of the present invention is therefore that of improving an autofocusing method, based on the use of, in particular, spot-shaped markers, in such a way that simple, exact, and rapid autofocusing is possible regardless of the microscope magnification that is set.

SUMMARY OF THE INVENTION

The aforesaid object is achieved by a method for autofocusing in a microscope, wherein at least two, in particular spot-shaped, markers are generated on an object, the spacing of which from one another representing an indication of the defocusing of a working plane in the object from the focal plane of the microscope; wherein said working plane is located in the focal plane when the markers are at a predefined spacing $d_F$; and wherein the working plane is displaced into the focal plane by means of a focus drive as a function of the marker spacing, the speed of the focus drive, i.e. the speed at which the working plane is displaced into the focal plane, being adjusted as a function of the marker spacing.

The subject of the invention is furthermore a corresponding autofocus device for carrying out the aforesaid method, the autofocus device encompassing a detector that acquires an image of the marker generated on the object, as well as an evaluation unit that determines the spacing of the markers, wherein a control unit is furthermore provided which adjusts the speed of the focus drive as a function of the determined marker spacing.

With no limitation of generality, the case in which the marker spacing is determined in a microscopic image of the markers will be considered below.

The present invention is not limited to the use of two markers. More than two markers can of course also be used. Spacings of the markers then need to be defined appropriately. The spacing of each two markers can then in turn be utilized to adjust, according to the present invention, the speed of the focus drive. Alternatively, it would be possible in such a case to form or define, from the multiple spacings of each two markers, a further reference variable (e.g. average spacing, sum of the spacings, or the like) as a function of which the focus drive is then adjusted.

Further advantages and embodiments of the invention are evident from the respective dependent claims and the description below, and from the attached drawings.

Advantages of the Invention

According to the present invention, the speed at which the focus drive displaces the working plane into the focal plane is adjusted, for autofocusing, as a function of the spacing of the markers located on the object. To simplify the explanation it will be assumed hereinafter, with no limitation of generality, that the predefined spacing $d_F$ of the markers at which the working plane is located in the focal plane is intended to equal zero, i.e. that when the working plane is optimally focused, the markers merge with one another or become coincident.

The speed of the focus drive (also referred to as "focusing speed") is to be controlled proportionally to the spacing of the markers. In other words, the smaller the spacing of the markers, the slower the focusing speed (speed of the focus drive) that is selected. Conversely, the farther apart the markers are from one another, the greater the speed of the focus drive (focusing speed) that is selected. For further explanation it will be assumed, with no limitation of generality, that exactly two markers are generated on the object. Upon focusing, the two markers move toward one another, and merge when the focal plane is reached. In a special case discussed later on, two markers are used, one of which is a so-called target marker that is generated by a corresponding beam path along the optical axis. The target marker remains immobile during the focusing operation, while a further marker moves toward said target marker.

Because the speed of the focus drive is adjusted proportionally to the marker spacing, the focusing speed is greater in a context of large spacings from the focus, so that the user no longer perceives the corresponding focus adjustment as time-consuming. Conversely, the focusing speed is lower for small spacings from the focus, so that, in particular at high microscope magnifications at which the markers quickly move toward one another, a corresponding speed "throttling" occurs. As will be further explained separately below, the microscope magnification can also be incorporated into the focusing speed control system as a further parameter.

It has proven to be advantageous if the proportional correlation between the focusing drive speed and the marker spacing can be represented by a polynomial function or an exponential function. A quadratic function or an exponential function is particularly advantageous.

A polynomial function can be presented in the following form:

$$v(d)=k_0 d^0+k_1 d^1+k_2 d^2 \ldots k_{x-1} d^{x-1}+k_x d^x,$$

where v designates the focusing speed and d the marker spacing. $k_0$ to $k_x$ designate the coefficients of the x-th-order polynomial function. In practice, a fourth-order function is sufficient; a quadratic function (second-order polynomial function) is advantageous.

The exponential function has the following form:

$$v(d)=k_0 * e^{k_1 d},$$

where $k_0$ and $k_1$ are coefficients of the exponential function.

To generate the markers on the object, corresponding autofocus beam paths are coupled into the beam path of the microscope. For generation of the corresponding autofocus beam paths, it is advantageous to use one or more point light sources. A "point light source" is to be understood as point-like light sources, such as LEDs or laser beam sources, that exhibit, in particular, a high parallelity of radiation. It is particularly preferred to use a laser diode. The radiation of the laser diode can serve as an autofocus beam path for generating a marker on the object. For this, the autofocus beam path is coupled via beam splitters into the beam path of the microscope. Alternatively, however, two (or more) point light sources can also be arranged directly in the beam path of the microscope. It is advantageous in this context if the two point light sources are arranged at the outermost edge of the beam path of the microscope, in particular outside the observation pupil of the objective.

Modern microscopes, in particular surgical microscopes, comprise a zoom system that is arranged after the microscope objective. Stereomicroscopes comprise a separate zoom system for each observation channel, which effect identical magnification in the two channels. With such microscopes, it is advantageous to perform the incoupling of the autofocus beam paths via beam splitters between the objective and the zoom system, or the zoom systems in the case of a stereomicroscope. Analogously, in the case of point light sources that are arranged in the beam path of the microscope, said sources are arranged between the objective and the zoom system(s).

The consequence of such an arrangement is that the diameter of the markers (laser spots) on the object remains the same regardless of the zoom magnification that is set, while the image of the markers is correspondingly magnified if the detector is, for its part, arranged behind the zoom system.

A further essential advantage of arranging the point light sources between the objective and zoom system(s), or of incoupling the autofocus beam paths between the objective and zoom system(s), is that the two autofocus beam paths can then be incoupled outside the active cross section (hereinafter "observation pupil"). This configuration will be discussed again separately below in the context of the exemplifying embodiments.

In general, the zoom systems used are afocal zoom systems that are arranged behind an objective that images to infinity. In such cases, the autofocus beam paths extend in the beam path of the microscope parallel to the optical axis of the microscope. Once again, incoupling or generation of the autofocus beam paths (laser beam paths, when a laser diode is used) outside the observation pupil is advantageous. When a different type of objective is used, the autofocus beam paths (laser beams, when a laser diode is used) are to be arranged correspondingly in convergent or divergent fashion if the markers are to merge in the focal plane. In principle, exact alignment of the autofocus beam paths relative to the optical axis is not of essential importance provided the markers that are generated have, in the focal plane, a predefined unique or unambiguous spacing $d_F$ from one another; that spacing can also be not equal to zero.

Zoom systems usually used in surgical microscopy have a zoom factor of 6 (maximum to minimum zoom magnification); the objectives usually used are multifocus objectives or so-called vario objectives, having adjustable focal lengths typically from 20 cm to 50 cm.

The autofocus beam paths extending through the microscope objective generate corresponding markers on the object. The radiation of the markers reflected from the object, hereinafter referred to for the sake of simplicity as "autofocus beam paths reflected from the object," extends through the observation beam path or paths of the microscope. It is useful to couple the image of the markers out of the observation beam path of the microscope by means of a corresponding beam splitter. When a zoom system is present, it is advantageous to perform this outcoupling behind the zoom system (as viewed from the objective). The beam splitter guides the outcoupled beam path onto a detector (camera), on whose light-sensitive sensor surface the marker image is then produced. In the case of a stereomicroscope it is useful to perform outcoupling of the reflected autofocus beam paths only out of one of the two observation beam paths of the stereomicroscope, since imaging of a monoscopic marker image is entirely sufficient for determining the spacing of the markers.

Especially in the context of manual autofocusing, for example by a surgeon as operator of a surgical microscope, it is useful to generate the markers using different wavelengths of the corresponding autofocus beam paths, which wavelengths should then derive from the visible wavelength region. This also makes it easy to detect passage through the focal plane, since the markers then "switch" colors. The focusing direction is thus easy to monitor.

In the context of automatic autofocusing, conversely, it is useful to use markers that are not visible to the human eye, i.e. in particular from the infrared wavelength region. Care must of course be taken that the beam splitters used to incouple and outcouple the autofocus beam paths, and the detector for acquiring the marker image, are designed for the autofocus beam path wavelengths that are used.

In accordance with an embodiment already indicated above, a target marker generated on the object by a target beam path extending along the optical axis of the microscope can be used. An advantage of such a target marker is that the focus destination, i.e. that region around the target marker which is being focused on, is indicated. This is advantageous in particular with three-dimensional object structures having elevations and depressions. It is advantageous in this connection to use a visible target marker, so that a surgeon or other operator of the microscope can see which object region is being focused on. The target marker can be used in addition to the (at least) two markers generated on the object that are used for autofocusing as described above.

Alternatively, the target marker can also replace one of the markers that are used for autofocusing as a function of the marker spacing. In this case one marker approaches the stationary target marker, and the two markers merge with one another when the focal plane is reached (with no limitation of generality).

For use of a manual autofocusing system, it is particularly advantageous to use visible autofocus beams to generate visible markers, in which context different wavelengths are used (e.g. a red and a green marker). In this case the operator of the microscope simultaneously sees the object region that is being focused on, so that a target marker is not absolutely necessary. In the case of automatic autofocusing, on the other hand, the use of invisible markers (in particular from the infrared wavelength region) is particularly preferred. The autofocus markers then do not influence optical investigation of the object region by the microscope operator. It is useful in this case to use a visible target marker, however, so that the microscope operator (surgeon) can detect the object region that is being focused on and can actively modify it as applicable.

The statements made above regarding markers also apply to the generation of a target marker, in particular with regard to incoupling of the corresponding target beam path and to the arrangement and use of point light sources for generating the target beam path.

As already indicated earlier, it is useful to adjust the speed of the focus drive additionally as a function of the microscope magnification. At a high microscope magnification, the speed at which the markers approach one another as the working plane approaches the focal plane is very much greater than at a lower microscope magnification. For a predefined distance between the working plane and the focal plane, however, the spacing of two marker points on the sensor/detector is also greater at a high microscope magnification than at a low microscope magnification. If the distance between the focal plane and the current working plane is the same in both cases, however, the focus speed should also have the same value. It is therefore useful to make the proportional correlation between the focus drive and marker spacing additionally dependent on the parameter of microscope magnification.

For this advantageous embodiment, the value of the microscope magnification must be delivered to the autofocus evaluation and control unit. Because the modifiable microscope magnification is determined chiefly by the modifiable zoom magnification, it is sufficient to deliver that zoom magnification $\Gamma$ to the evaluation and control unit. The value of $\Gamma$ is usually between 0.4 and 2.4.

It is advantageous to account for the microscope magnification by modifying the ascertained marker spacing. With no limitation of generality, only the zoom magnification will be considered below. The following modification of the marker spacing is particularly preferred:

$d' = d/\Gamma$

At high zoom magnification ($\Gamma=2.4$), the large spacing of markers d is correspondingly reduced to d'. At a low zoom magnification ($\Gamma=0.4$), however, the small marker spacing d is increased to d'. The influence of zoom magnification on focusing speed can consequently be eliminated by this modification of the marker spacing. All that is necessary is to replace d with d' in the equations described above.

With the present configuration for autofocusing, it is possible to ascertain the microscope magnification from the rate of change in the marker spacing at a constant focus drive speed. Specifically: the higher the microscope magnification, the greater the speed at which the markers on the object will move toward one another as the focal plane is approached, if the focus drive speed remains set to a constant value. For example, the system can be calibrated for known microscope magnifications in terms of the rate of change in the marker spacing at a constant focus drive speed, and upon subsequent operation the particular microscope magnification that is set can be ascertained from that calibration curve. Alternatively, in present-day modern microscopes the microscope magnification or zoom magnification can as a general rule be picked off or tapped as an electronic signal.

The invention further relates to an autofocus device for carrying out the method according to the present invention discussed in detail above. All statements in conjunction with the method and its embodiments are valid similarly for the autofocus device according to the present invention, without requiring separate explanations for that purpose. The description hereinafter of the autofocus device and its embodiments will therefore be limited to the apparatus elements necessary therefor.

The autofocus device according to the present invention comprises a detector for acquiring a microscopic image of the markers generated on the object; also provided is an evaluation unit that determines the spacing of the markers. As a function of the determined marker distance and optionally of further microscope parameters, such as in particular the microscope magnification or zoom magnification, the speed of the focus drive, i.e. the speed at which the working plane is displaced into the focal plane, is adjusted by means of a control unit. Be it noted in this connection that the focus drive can be operatively connected to a corresponding multifocus or vario objective whose focal length is modifiable within a predefined range. Alternatively or additionally, (at least) the microscope objective can be shifted in the direction of the optical axis in order to adjust the focus. Again alternatively or additionally, the microscope stage on which the object to be investigated is positioned can be shifted along the optical axis for focusing purposes. The focusing drive can consequently act on one or more of the components described, the "speed of the focus drive" always being intended to mean the speed at which the working plane in the object is displaced into the focal plane.

A particularly suitable configuration of an autofocus device for autofocusing in a microscope can be described as follows: On the side of the microscope objective facing away from the object, two point light sources are arranged in front of the zoom system arranged downstream from the objective. It is assumed that the objective images at infinity. The point light sources generate autofocus beam paths extending parallel to the optical axis. The point light sources are, in particular, arranged outside the observation pupil. If the working plane of the object is located in the focal plane, the markers generated on the object by the autofocus beam path merge or become coincident. A beam splitter, which couples the image of the markers out of the observation beam path of the microscope and delivers it to a detector (camera), is arranged behind the zoom system as viewed from the object. In the case of a stereomicroscope having two zoom systems for generating two observation beam paths, it is sufficient if the beam splitter is arranged behind one of the two zoom systems, i.e. in one of the two observation beam paths. The detector is operatively connected to an evaluation unit. A determination of the spacing of the markers in the marker image occurs in this evaluation unit. A corresponding control signal for a focus drive speed is associated with the marker spacing. A corresponding control unit conveys this signal to the focus drive. The focus drive is in turn connected to the corresponding microscope component that is responsible for focusing the microscope. This can be one or more of the following components: multifocus or vario objective, z displacement of the objective, and z displacement only of the microscope stage ("z displacement" meaning a displacement in the direction of the optical axis). When a multifocus objective is used, it may be useful to provide, in addition to focusing with the multifocus objective, a focusing action by means of a shift of the objective or of the microscope stage, if the defocusing lies outside the range that can be covered with the multifocus objective.

It is understood that the features recited above and those yet to be explained below are usable not only in the particular combination indicated, but also in other combinations or in isolation, without departing from the scope of the present invention.

BRIEF DESCRIPTION OF THE DRAWING VIEWS

The invention is schematically depicted in the drawings on the basis of an exemplifying embodiment, and will be described in detail below with reference to the drawings, in which.

DETAILED DESCRIPTION OF THE INVENTION

Figure 1:
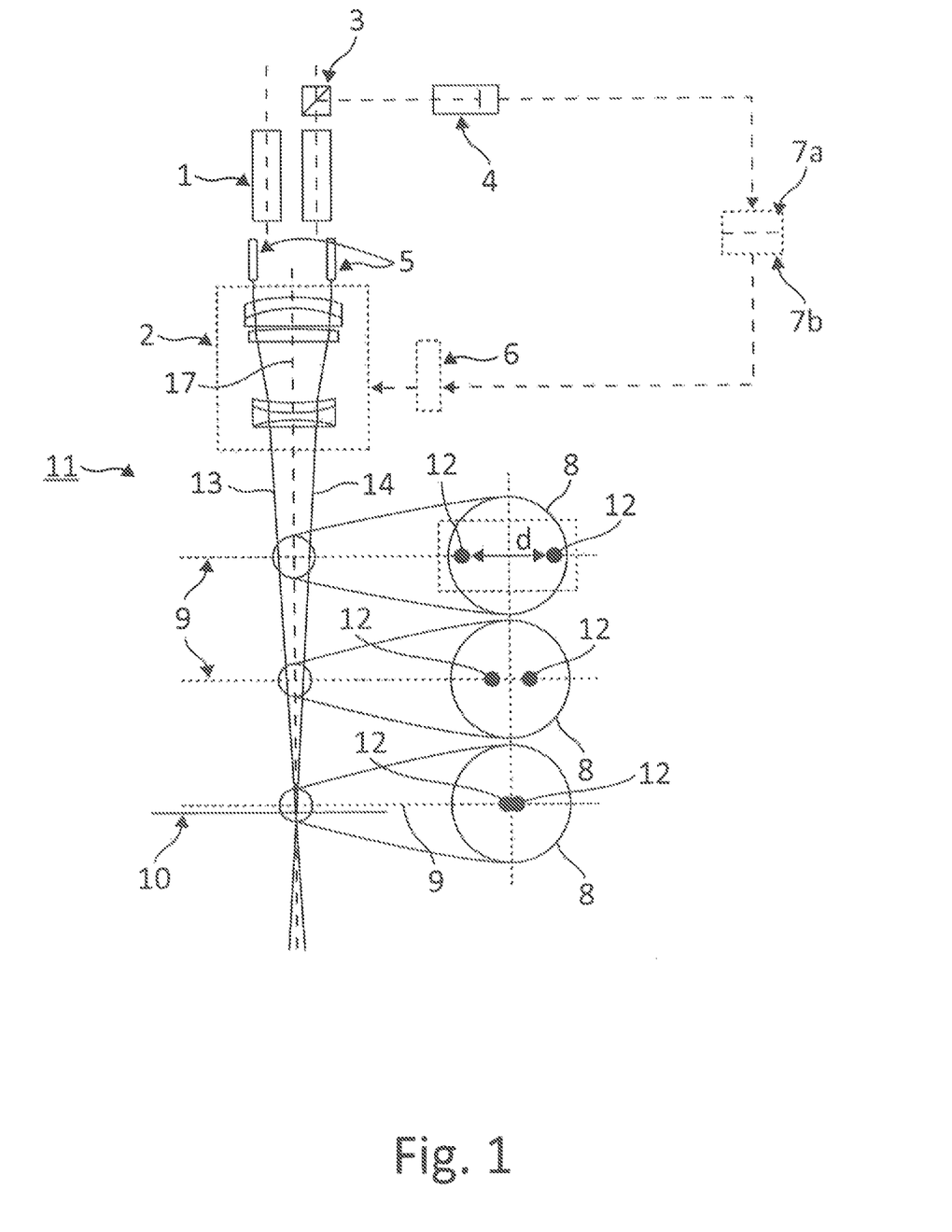
FIG. 1 schematically shows the configuration of an autofocus device according to the present invention in a stereomicroscope.

FIG. 1 schematically shows a particularly preferred embodiment of an autofocus device for autofocusing in a microscope 11. Only the most essential components of the microscope (here a stereomicroscope) are depicted, to the extent necessary for explaining the present invention. In this embodiment, the stereomicroscope 11 comprises a multifocus objective 2 as well as a zoom system 1 made up of two zoom channels. Further components of the stereomicroscope, such as the binocular tube, are not depicted here. For the sake of simplicity, it will be assumed that the focusing of microscope 11 is performed exclusively by means of multifocus objective 2. Shifts of objective 2 and/or of the microscope stage (not depicted) for focusing purposes are accordingly not considered in the present case.

The autofocus device is made up substantially of a detector 4, an evaluation unit 7a and a control unit 7b which are combined into one common unit, and focus drive 6 that controls multifocus objective 2. Detector 4 can be a (CCD) camera, which acquires an image of markers 12 on an object to be investigated with microscope 11. The spacing d of markers 12 is determined in evaluation unit 7a. Evaluation unit 7a and control unit 7b can also be implemented separately from one another; in particular, evaluation unit 7a can also be a constituent of detector 4, and control unit 7b can in turn be a constituent of focus drive 6.

FIG. 1 depicts three image segments or regions 8 that show the image of markers 12 on the object, the working plane 9 of which has a spacing from focal plane 10. Image segment 8 can be a segment of the image acquired by camera/detector 4. The uppermost image segment 8 is associated with the upper working plane 9, which is located far away from focal plane 10. The middle image segment 8 is associated with the middle working plane 9, which is located closer to focal plane 10; the lowest image segment 8 is associated with a working plane 9 that is located very close to focal plane 10. The spacings d of markers 12 in said image segments 8 accordingly decrease as working plane 9 approaches focal plane 10. In the lowest image segment 8, markers 12 touch one another; upon reaching focal plane 10 they would merge or become coincident. The corresponding spacing $d_F$ is then 0.

In this embodiment, two autofocus beam paths 13 and 14, which are in turn each generated by a point light source 5, are used to generate markers 12. The two point light sources 5 (in this case laser diodes) are arranged outside the observation pupil of objective 2 in the beam path of microscope 11 (see also, in this regard, the explanations of FIG. 3). They generate autofocus beam paths 13, 14 that extend parallel to optical axis 17 of microscope 11 and are focused by objective 2 in focal plane 10.

If autofocus beam paths having wavelengths from the visible region are selected, the markers on an object that is located in a current working plane 9 are then visible. In such a case it is useful to use two different wavelengths. For example, above focal plane 10, right marker 12 would have a color 1, and left marker 12 a color 2; after focal plane 10 has been passed through, the colors would be "switched," i.e. the right marker 12 would then have color 2, while the left marker 12 has color 1. The focusing direction can thereby easily be detected.

Markers 12 present on the object are imaged by the microscope components and the detector/camera components onto a detector surface of detector 4. Corresponding image segments 8 are, as already explained, depicted in FIG. 1. A beam splitter 3, which is preferably arranged behind zoom system 1 (as viewed from objective 2), is provided in order to outcouple the marker image. Because a monoscopic marker image is sufficient for evaluation of the marker spacing d, it is appropriate to arrange beam splitter 3 in only one of the two observation beam paths of stereomicroscope 11.

Evaluation unit 7a evaluates the spacing d of the two markers 12 in the marker image, using image processing methods known per se. As a function of the determined marker spacing d, control unit 7b generates a corresponding signal for focus drive 6. The signal of control unit 7b controls the speed of focus drive 6, i.e. the speed at which the current working plane 9 is shifted into focal plane 10. For this, the lens element responsible for focusing in multifocus objective 2 is shifted at the corresponding speed proportionally to the marker spacing.

For a large spacing d between the current working plane 9 and focal plane 10 (see uppermost image segment 8), a high focusing speed is selected by control unit 7b and the corresponding signal is sent to focus drive 6. As the marker spacing d decreases, the focusing speed becomes lower. For a very small spacing d (see lowest image segment 8) the focusing speed is set to be correspondingly low so as to enable a controlled approach to focal plane 10. This can prevent unintentional passage through focal plane 10. The correlation between v and d is preferably quadratic or exponential.

Figure 2:
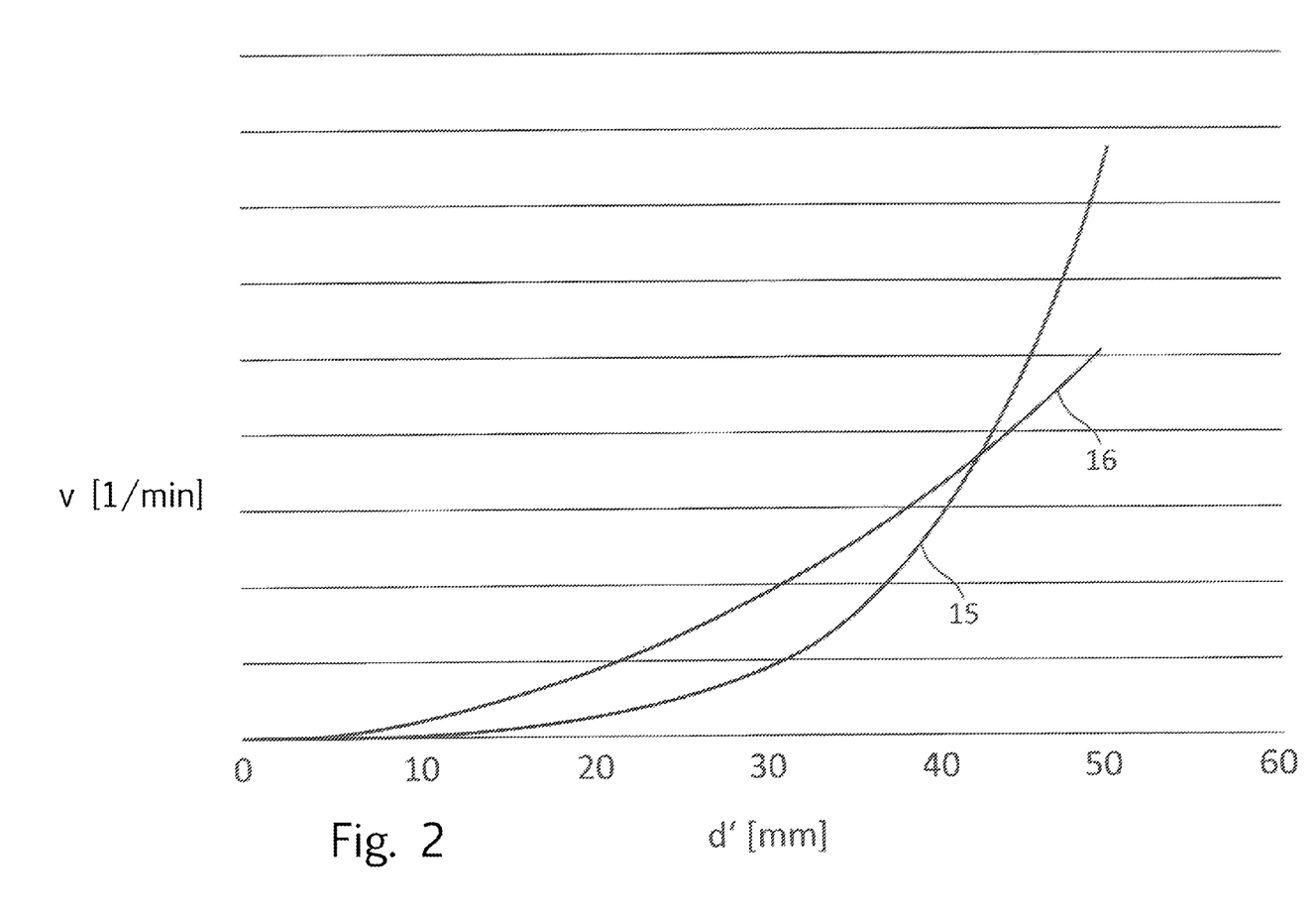
FIG. 2 schematically shows the proportional correlation between marker spacing and focus speed in a preferred embodiment.

FIG. 2 qualitatively shows a preferred correlation between focus speed v (in 1/min) and modified marker distance d' (in mm) The value d' is determined by dividing the marker spacing d by the zoom magnification $\Gamma$ ($\Gamma$=0.4 to 2.4). FIG. 2 depicts two preferred control curves 15 and 16; control curve 15 describes an exponential correlation between v and d', and control curve 16 creates a polynomial, specifically quadratic correlation between v and d'. It is clearly apparent that in both cases, an approximately linear correlation with focusing speed exists for large marker spacings, while as the marker spacings decrease, focusing speed v is more greatly decelerated. One of the functions depicted according to FIG. 2 is advantageously stored as a control curve in control unit 7b. Provision can be made to allow adaptation of this function as the customer desires.

Figure 3:
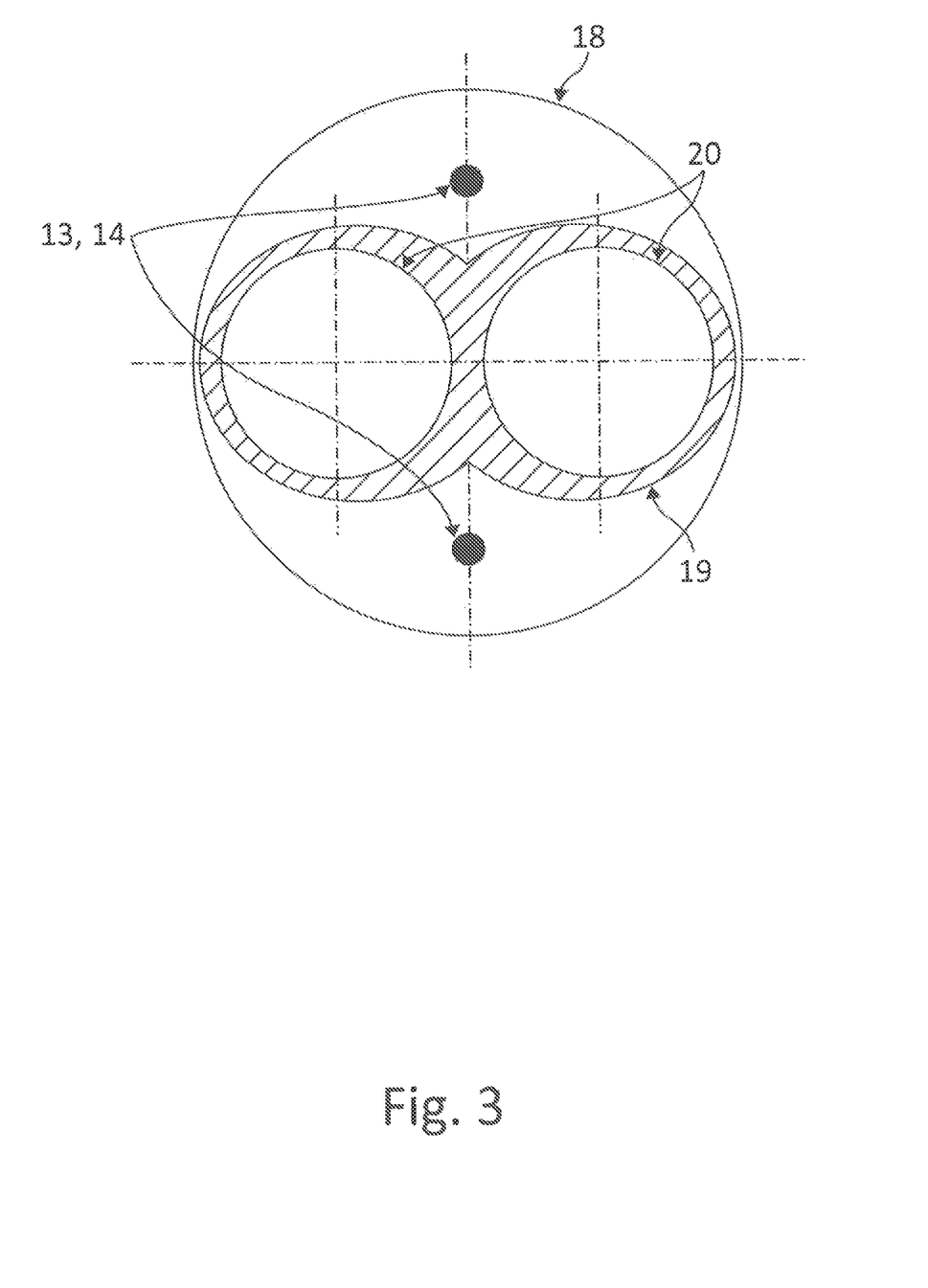
FIG. 3 schematically shows a cross section through the main beam path of the microscope of FIG. 1.

FIG. 3 schematically shows a cross section through the (main) beam path of a microscope as depicted in FIG. 1. The cross section is located, for example, at a point between objective 2 and zoom system 1 (see FIG. 1). The cross section of objective 2, which encloses both channels of zoom system 1, is depicted. The zoom system pupil, or more precisely the pupils of the two zoom channels, are labeled 20. An observation pupil 19 in the plane of the objective is defined principally by the entry pupil of the zoom system (zoom channels). The region between observation pupil 19 and the edge of the objective is referred to as the clear aperture 18 of the objective.

If autofocus beam paths 13, 14 are arranged in the region of clear aperture 18 of the objective, this results in the essential advantage that the two autofocus beam paths 13, 14 can be coupled in outside observation pupil 19. Conversely, if autofocus beam paths 13, 14 were coupled in after zoom system 1 (as viewed from objective 2), they would need to be placed directly in observation pupil 19 in order to allow them to strike the object; this would, however, result in vignetting.

PARTS LIST

1 Zoom system
2 Objective
3 Beam splitter
4 Detector
5 Point light source
6 Focus drive
7a Evaluation unit
7b Control unit
8 Image segment
9 Working plane
10 Focal plane
11 (Stereo)microscope
12 Marker
13, 14 Autofocus beam path
15 Control curve
16 Control curve
17 Optical axis
18 Clear aperture of objective
19 Observation pupil
20 Zoom system pupil
d Spacing of markers
$d_F$ Spacing of markers in focal plane
v Speed of focus drive
d' Modified marker spacing
$\Gamma$ Microscope/zoom magnification

What is claimed is:

1. A method for autofocusing in a microscope (11), wherein the microscope includes a microscope beam path parallel to or coincident with an optical axis of the microscope, an objective (2) in the microscope beam path, and a zoom system (1) in the microscope beam path, the method comprising the steps of:
   generating at least two markers (12) on an object, wherein a spacing (d) of the markers (12) from one another represents an indication of the defocusing of a working plane (9) in the object from the focal plane (10) of the microscope (11), and wherein the working plane (9) is located in the focal plane (10) when the markers (12) are at a predefined spacing ($d_F$), wherein the markers (12) are generated by respective autofocus beam paths (13, 14) generated by respective point light sources (5), wherein the autofocus beam paths (13, 14) originate or are introduced into the microscope beam path at a location between the objective (2) and the zoom system (1);
   imaging the markers on the object and evaluating the spacing of the markers in the marker image using image processing methods to determine a marker spacing (d); and
   sending a control signal to a focus drive (6) of the microscope (11) to displace the working plane (9) into the focal plane (10) as a function of the marker spacing (d) by means of the focus drive (6), wherein a speed (v) of the focus drive (6) by which the working plane (9) is displaced into the focal plane (10) is adjusted as a function of the marker spacing (d).

2. The method according to claim 1, wherein the speed (v) of the focus drive (6) is adjusted as a second order polynomial function or an exponential function of the marker spacing (d).

3. The method according to claim 1, wherein the point light sources (5) are arranged out of the microscope beam path.

4. The method according to claim 1, wherein the point light sources (5) are arranged in the microscope beam path.

5. The method according to claim 4, wherein the microscope (11) has an objective (2) and a downstream zoom system (1), and wherein the point light sources (5) are arranged between the objective (2) and zoom system (1).

6. The method according to claim 1, wherein the microscope (11) has an objective (2) and a downstream zoom system (1), and further comprising the steps of:
   outcoupling the corresponding autofocus beam paths (13, 14), reflected from the object, out of the beam path of the microscope (11); and
   acquiring an image of the markers (12) located on the object on a detector (4).

7. The method according to claim 6, wherein the outcoupling of the reflected autofocus beam paths (13, 14) is performed behind the zoom system (1), as viewed from the objective (2) of the microscope (11).

8. The method according to claim 6, wherein the microscope is a stereomicroscope having two observation beam paths, and the outcoupling of the reflected autofocus beam paths (13, 14) is performed out of only one of the two observation beam paths of the stereomicroscope (11).

9. The method according to claim 1, wherein the autofocus beam paths (13, 14) have different beam wavelengths respectively associated therewith to generate the markers (12).

10. The method according to claim 9, wherein the beam wavelengths are in the visible wavelength region.

11. The method according to claim 1, wherein a target marker is generated on the object by a target beam path proceeding along an optical axis (17) of the microscope (11).

12. The method according to claim 11, wherein the target marker is one of the at least two markers (12) generated on the object.

13. The method according to claim 11, wherein the target marker is generated on the object in addition to the at least two markers (12) generated on the object.

14. The method according to claim 1, further comprising the step of determining the microscope magnification ($\Gamma$), and wherein the speed (v) of the focus drive (6) is adjusted additionally as a function of the microscope magnification ($\Gamma$).

15. The method according to claim 14, wherein the speed (v) of the focus drive (6) is adjusted as a function of a modified marker spacing (d'), such that $d'=d/\Gamma$, where d equals marker spacing and $\Gamma$=microscope magnification.

16. The method according to claim 14, wherein the microscope magnification ($\Gamma$) is ascertained from the rate of change in the marker spacing (d) at a constant focus drive speed.

17. An autofocus device for autofocusing in a microscope (11), wherein the microscope includes a microscope beam path parallel to or coincident with an optical axis of the microscope, an objective (2) in the microscope beam path, and a zoom system (1) in the microscope beam path, the autofocus device comprising:
   at least two point light sources (5) for generating at least two associated autofocus beam paths (13, 14) which generate at least two markers (12) on an object, wherein the autofocus beam paths (13, 14) originate or are introduced into the microscope beam path at a location between the objective (2) and the zoom system (1), wherein a spacing (d) of the markers (12) from one another represents an indication of the defocusing of a working plane (9) in the object from the focal plane (10) of the microscope (11), and wherein the working plane (9) is located in the focal plane (10) when the markers (12) are at a predefined spacing ($d_F$);
   a detector (4) arranged to acquire an image of the markers (12) generated on the object;
   an evaluation unit (7a) connected to the detector (4), the evaluation unit (7a) being configured to determine the spacing (d) of the markers (12) from one another using image processing methods; and
   a control unit (7b) connected to the evaluation unit (7a), the control unit (7b) being configured to send a control signal to a focus drive (6) of the microscope (11) to adjust a speed (v) of the focus drive (6) by which the working plane (9) is displaced into the focal plane (10) as a function of the marker spacing (d).

18. The autofocus device according to claim 17, wherein two or more beam splitters (3) are provided in order to generate the at least two markers (12) on the object.

19. The autofocus device according to claim 17, wherein the at least two point light sources (5) are arranged in a beam path of the microscope (11).

20. The autofocus device according to claim 19, wherein the microscope (11) has an objective (2) and a downstream zoom system (1), and wherein the at least two point light sources (5) are arranged between the objective (2) and zoom system (1).

21. The autofocus device according to claim 17, wherein the microscope (11) has an objective (2) and a downstream zoom system (1), the autofocus device further comprising a beam splitter (3) arranged behind the zoom system (1) as viewed from the objective (2) of the microscope (11), the beam splitter (3) receiving the at least two autofocus beam paths (13, 14) after reflection by the object and outcoupling the at least two autofocus beam paths (13, 14) out of the beam path of the microscope (11), wherein the detector (4) acquires the image of the markers (12) after the outcoupling.

22. The autofocus device according to claim 21, wherein the microscope (11) is a stereomicroscope (11) having two observation beam paths, and wherein the beam splitter (3) for outcoupling the reflected autofocus beam paths (13, 14) is arranged in only one of the two observation beam paths of the stereomicroscope.

* * * * *

UNITED STATES PATENT AND TRADEMARK OFFICE
CERTIFICATE OF CORRECTION

| | | |
|---|---|---|
| PATENT NO. | : 9,036,021 B2 | |
| APPLICATION NO. | : 13/610994 | |
| DATED | : May 19, 2015 | |
| INVENTOR(S) | : Manfred Kuster | |

It is certified that error appears in the above-identified patent and that said Letters Patent is hereby corrected as shown below:

Title page, item (73), the Assignee should read:

--LEICA MICROSYSTEMS (SCHWEIZ) AG, Heerbrugg (CH)--

Signed and Sealed this
Third Day of November, 2015

Michelle K. Lee
*Director of the United States Patent and Trademark Office*